Dec. 21, 1943.   P. W. SPELL   2,337,355
STALK CUTTER
Filed April 15, 1942   5 Sheets-Sheet 1
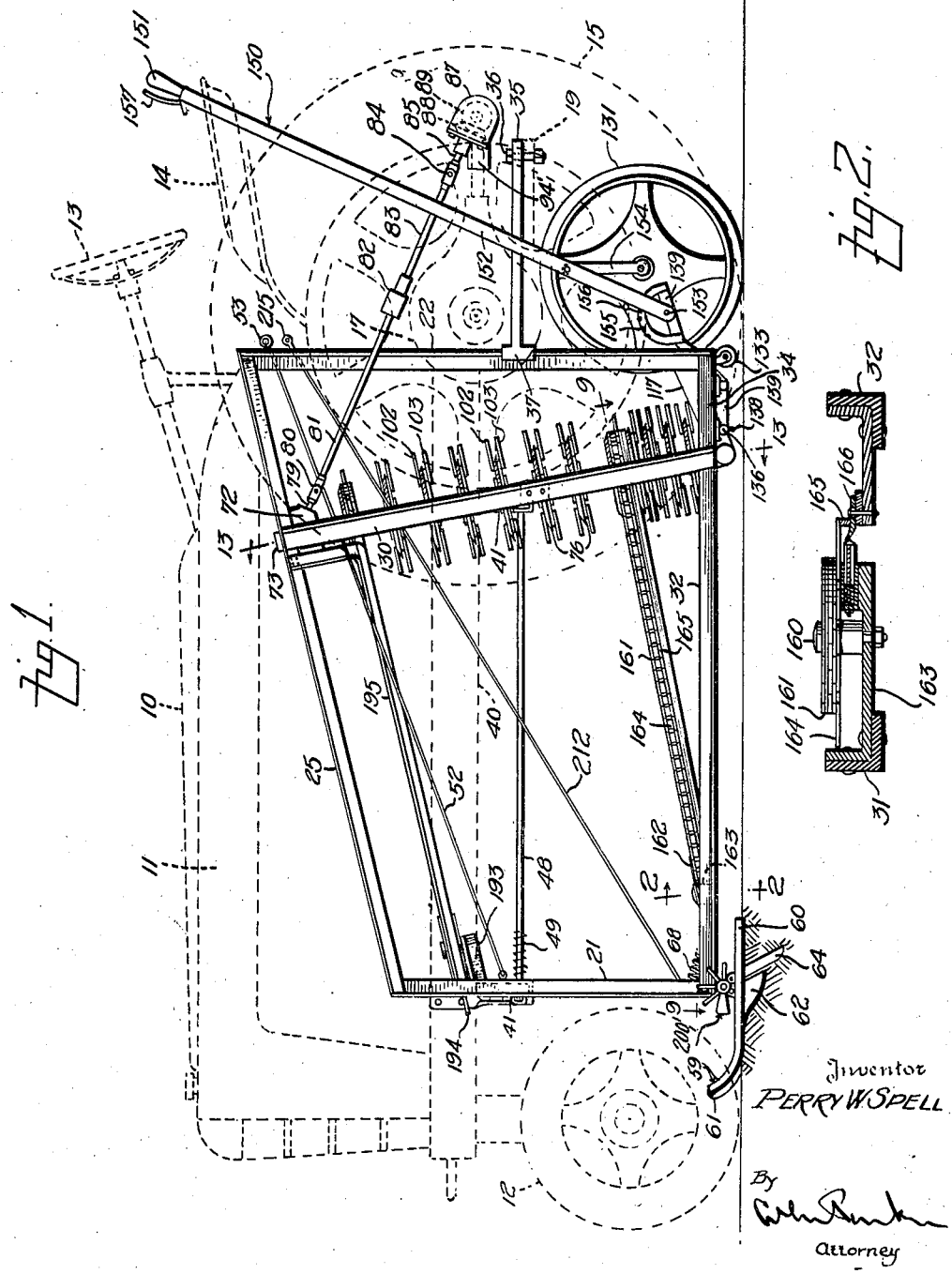
Inventor
PERRY W. SPELL

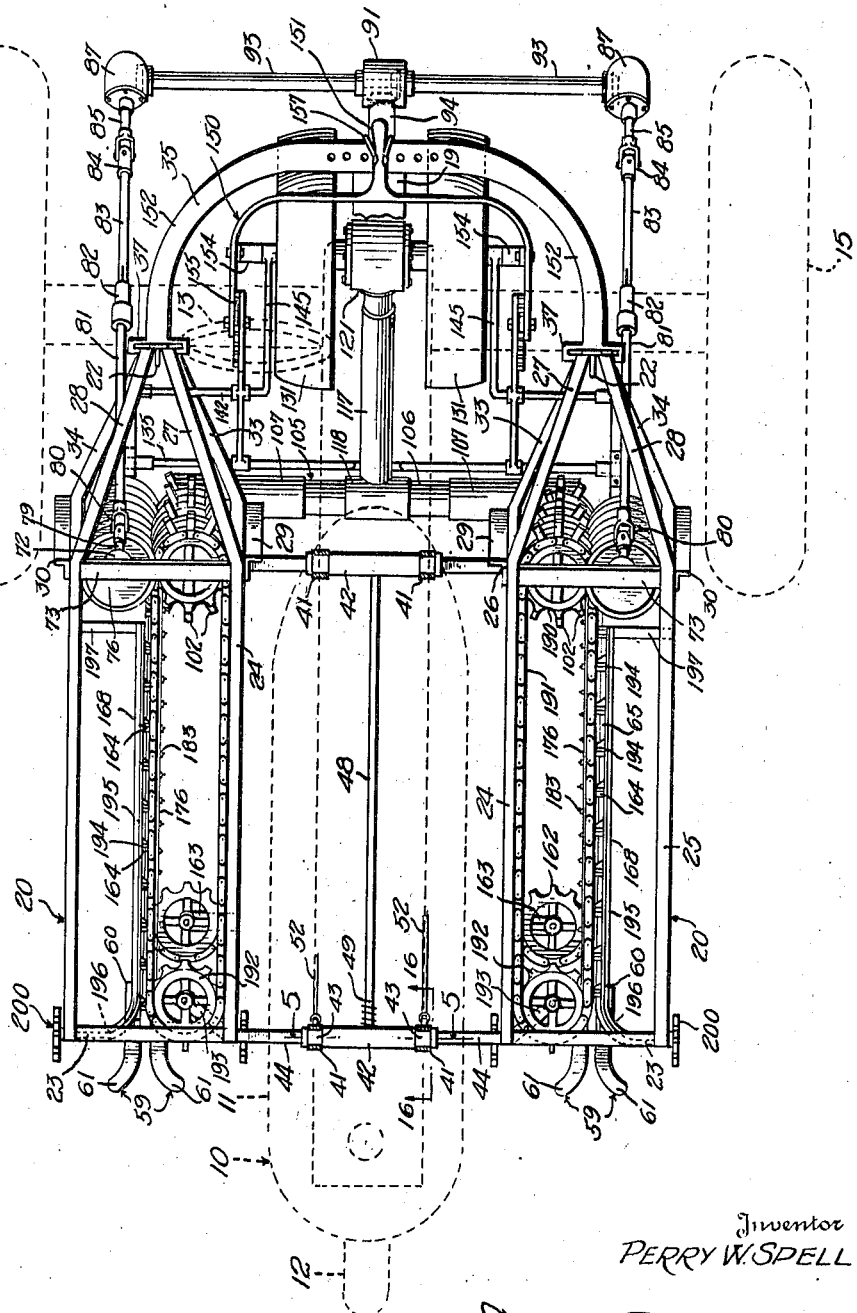

Dec. 21, 1943.   P. W. SPELL   2,337,355
STALK CUTTER
Filed April 15, 1942   5 Sheets-Sheet 3
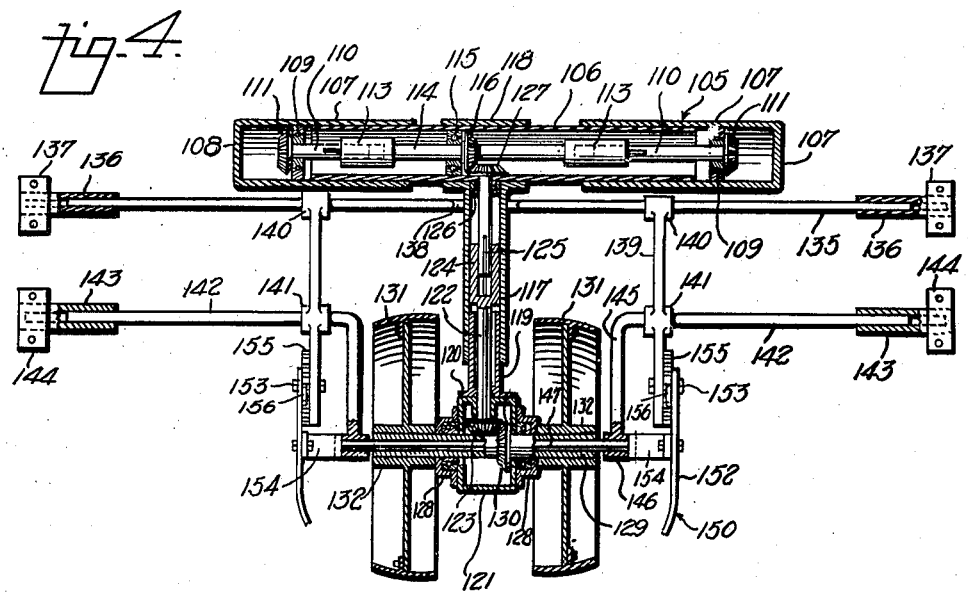
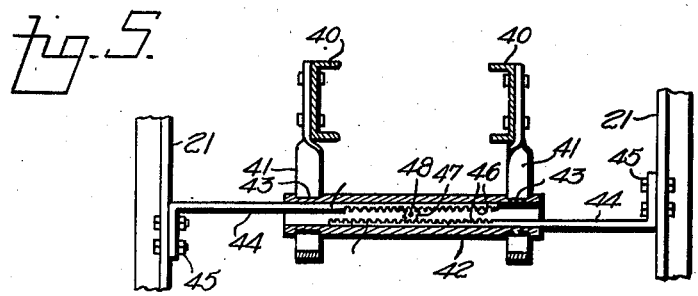
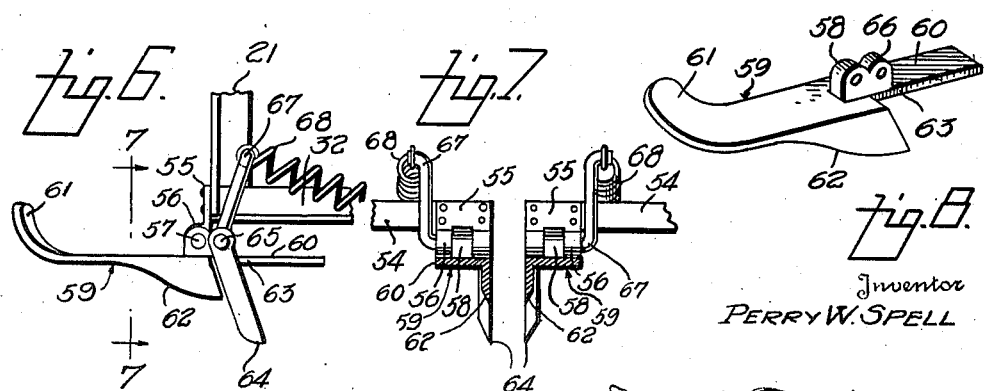
Inventor
PERRY W. SPELL
By
Attorney Dec. 21, 1943.　　　P. W. SPELL　　　2,337,355
STALK CUTTER
Filed April 15, 1942　　　5 Sheets-Sheet 4
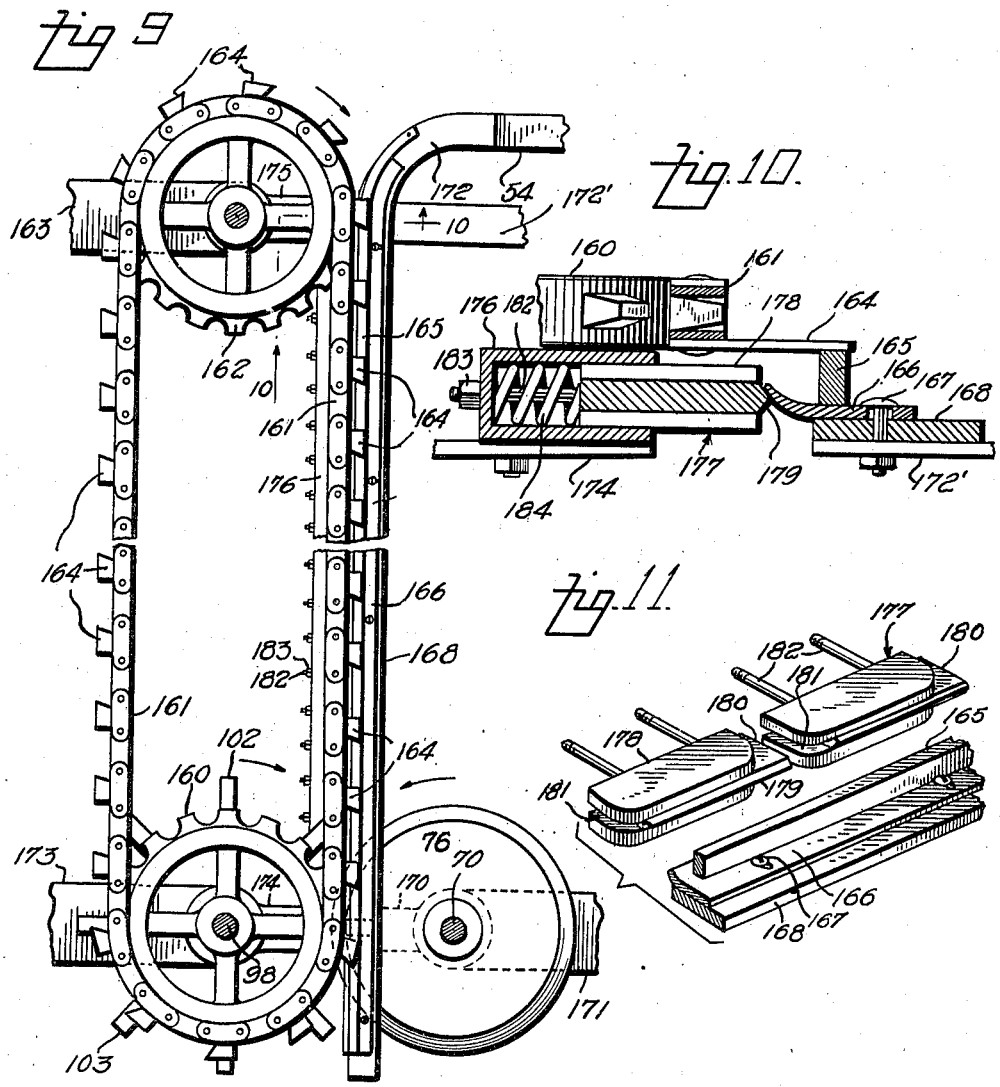
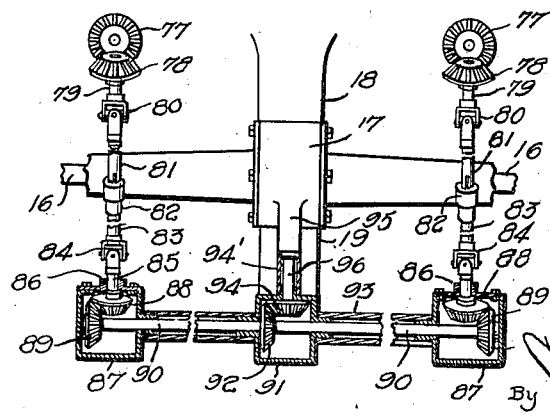
Inventor
PERRY W. SPELL Dec. 21, 1943.    P. W. SPELL    2,337,355
STALK CUTTER
Filed April 15, 1942    5 Sheets-Sheet 5
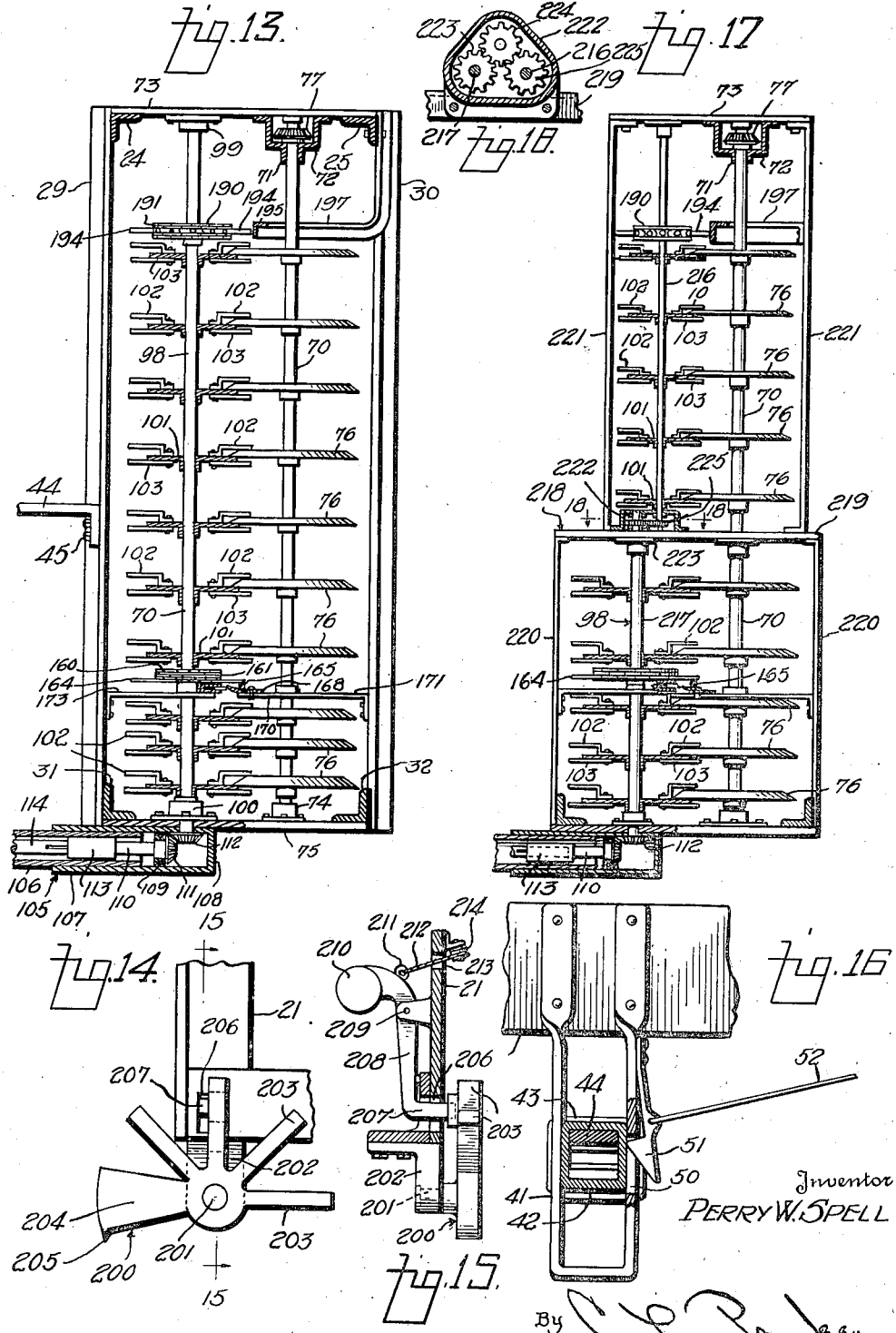
Inventor
PERRY W. SPELL Patented Dec. 21, 1943

2,337,355

UNITED STATES PATENT OFFICE 2,337,355

STALK CUTTER

Perry W. Spell, Roseboro, N. C.

Application April 15, 1942, Serial No. 439,119

17 Claims. (Cl. 55—62)

This invention relates to stalk cutters and is an improvement over my prior Patent No. 2,067,104, granted January 5, 1937.

An important object of the invention is to provide an improved stalk cutting mechanism, particularly a mechanism adapted for cutting the stalks of corn, cotton, tobacco and other plants wherein the stalk is uprooted and cut into relatively small pieces which can be readily turned under, the pieces being sufficiently small so as not to interfere with future cultivation of the soil.

A further object is to provide a novel apparatus of the character referred to which may be mounted as a dual mechanism on opposite sides of a conventional tractor so as to render it operative for simultaneously uprooting and cutting the stalks of two rows at a time.

A further object is to provide such a dual apparatus wherein the cutting mechanisms as a whole are supported in a novel manner with respect to a tractor and wherein the two units are adjustable toward and away from each other to permit the apparatus to operate properly with respect to rows of stalks the distances between which vary somewhat, whereby successive stalks in a row are out of the line of movement of the apparatus.

A further object is to provide novel means for positively pulling the stalks from the ground and for positively feeding them to the cutters.

A further object is to provide novel driving mechanisms for the stalk cutting and feeding devices, and more specifically to provide novel means for directly driving the cutters from a power take-off mechanism driven by the source of power of the tractor.

A further object is to provide an apparatus of the character just referred to wherein power for driving the feeding mechanism is derived from a wheeled structure adapted to roll over the ground, and wherein the apparatus is provided with novel means for rendering such driving means inoperative when desired.

A further object is to provide novel means for cutting the laterally extending roots of the stalks to facilitate the lifting of the stalks from the ground.

A further object is to provide a novel arrangement of parts operative for elevating the forward end of each cutting frame and maintaining it in elevated inoperative position.

Other objects and advantages of the invention will become apparent during the course of the following description.

In the drawings I have shown two embodiments of the invention. In this showing:

Figure 1 is a side elevation of the apparatus shown in position with relation to a tractor, Figure 2 is an enlarged detail sectional view on line 2—2 of Figure 1, parts being shown in elevation, Figure 3 is a plan view of the apparatus shown in position with respect to a tractor.

Figure 4 is an enlarged detail sectional view through the driving mechanism for the stalk feeding means, Figure 5 is an enlarged detail fragmentary sectional view taken on line 5—5 of Figure 3, Figure 6 is an enlarged fragmentary side elevation of a portion of one of the cutting mechanisms at the lower front end of one frame, particularly showing the guiding and root cutting elements, Figure 7 is a fragmentary sectional view on line 7—7 of Figure 6, Figure 8 is a detail perspective view of one of the stalk guiding and root cutting elements, Figure 9 is an enlarged detail fragmentary sectional view on line 9—9 of Figure 1, Figure 10 is a similar view on line 10—10 of Figure 9, the sprocket being shown in elevation, Figure 11 is an enlarged fragmentary perspective view of parts of the stalk gripping and lifting mechanism, the elements thereof being shown separated, Figure 12 is a detail fragmentary plan view of parts of the cutter driving mechanism and associated elements of the tractor, parts being broken away and parts being shown in section, Figure 13 is a section taken on line 13—13 of Figure 1, Figure 14 is an enlarged fragmentary side elevation of a portion of the frame elevating mechanism, Figure 15 is a detail sectional view on line 15—15 of Figure 14, parts being shown in elevation, Figure 16 is an enlarged fragmentary sectional view on line 16—16 of Figure 3, parts being shown in elevation, Figure 17 is a sectional view similar to Figure 13 showing a modified form of construction, and, Figure 18 is a detail fragmentary sectional view on line 18—18 of Figure 17.

Referring to Figures 1 and 2 the numeral 10 designates as a whole a tractor of conventional type which is provided with a relatively narrow forward body 11 having its forward end supported by a dirigible wheel 12 operated in the usual manner from a steering wheel 13 adjacent the driver's seat 14. The rear end of the tractor is supported by relatively widely spaced traction wheels 15 of substantial size. These wheels are driven by axles 16 (Figure 12) having their inner ends driven by the usual differential gearing (not shown) in a housing 17. This housing is at the rear end of a housing 18 extending forwardly for connection with the body of the tractor in which is arranged the usual power plant. The differential housing 17 is provided with a rearwardly extending integral draft connection member 19 to which farm implements are customarily connected, and the element 19 forms the only positive connection with the apparatus to be described by means of which such apparatus is moved forwardly over the ground. This arrangement will be described in detail later.

Referring to Figure 3 it will be noted that the structure of the particular type of tractor with which the present apparatus is intended to be used is such as to provide substantial spaces outwardly of the body 11 and forwardly of the wheels 15, such space extending within the space between the wheels 15 rearwardly of the front portions thereof. These spaces are utilized for the stalk lifting and cutting mechanisms of the present invention. One such mechanism is shown in each of the spaces referred to and will be described in detail latter. Generally speaking, each of the stalk lifting and cutting mechanisms is indicated as a whole by the numeral 20 and each comprises spaced vertical forward posts 21 and a rear post 22. The upper ends of the forward posts of each unit are connected by a cross member 23 (Figure 3). At each side of each unit upper, inner and outer rails 24 and 25 extend from the cross member 23 rearwardly parallel to each other approximately to the points 26 and then converge as at 27 and 28 respectively for connection with the rear post 22. The rails 24 and 25 lie in a common plane which slopes upwardly and rearwardly as shown in Figure 1.

Inner and outer vertical connecting members 29 and 30 (Figures 1 and 13) are connected at their upper ends to the rails 24 and 25 and extend downwardly approximately perpendicular to the plane of the rails 24 and 25 as shown in Figure 1. Lower inner and outer rails 31 and 32 are connected at their forward ends to the forward posts 21 and extend rearwardly therefrom in a horizontal plane and parallel to each other until they reach the connecting members 29 and 30, and rearwardly of these members the rails 31 and 32 converge rearwardly as at 33 and 34 respectively for connection with the rear post 22.

Each of the units 20 carries a stalk connecting and lifting mechanism, to be referred to in detail later. To effect positive movement of such units with the tractor a relatively heavy rigid yoke 35 is bolted as at 36 (Figure 1) to the draft connection 19. The ends of the yoke 35 are provided with suitable undercut slotted guides 37 receiving the edges of the rail 32, which is of T-section. Each guide 37 relatively loosely receives the flange of its associated post 22 in order to permit the latter to move vertically while partaking of very slight movement from its true vertical position. Moreover, the grooves of the guides 37 are substantially deeper than the width of the base of each post 22 to permit these posts to move transversely with respect to the tractor for a purpose to be described.

Referring to Figure 5 it will be noted that the inner forward posts 21 of the two stalk lifting and cutting units are shown as to their position with relation to the side frame members 40 of the chassis of the tractor. Each of the frame members 40 carries a depending strap 41 and through these straps extends a housing 42 grooved at its ends as at 43 to receive the strips 41. Accordingly the housing 42 is guided for vertical movement in the straps 41 but is prevented from partaking of any longitudinal movement, that is, movement transversely of the tractor. The housing 42 is open at both ends and upper and lower bars 44 extend therethrough and are connected at their ends as at 45 to the respective posts 21. The adjacent faces of the bars 44 are formed as racks 46 and these racks are engaged by a pinion 47 mounted on a shaft 48. The rear end of this shaft is provided with a pinion (not shown) identical with the pinion 47 and operating in the same manner and for the same purpose, as will be described. Such other pinion engages racks carried by bars similar to the bars 44 arranged in another of the housings 42 which are also carried by straps 41 and these straps are arranged approximately in transverse alinement with the connecting members 29 and are secured thereto in the same manner that the bars 44 in Figure 5 are connected to the posts 21. Inasmuch as the mechanism associated with the rear straps 41 is identical with that in the forward straps 41, except as will be described, they have not been shown in detail except that the connection of one of the rear bars 44 to one of the connecting members 29 has been shown in Figure 13.

A torsion spring 49 surrounds the shaft 48 adjacent its forward end, the rear end of the spring being connected to the shaft 48 and the forward end being connected to the adjacent housing 42. This spring is provided for the purpose of tending to maintain the shaft in a normal position, thus similarly tending to maintain the pin 47 and racks 46 in normal positions whereby the two units will normally remain equidistantly spaced, as will become apparent.

The forward straps 41 are each provided in one leg thereof with a slot 50 (Figure 16) in which is arranged a latch 51 adapted to engage beneath the housing 42 to support the latter when it is raised in a manner to be described. Suitable pull rods 52 are connected to the latches 51 and are provided at their rear ends with rings 53 or other handles (Figure 1) by means of which the latches 51 may be released.

The forward end of each unit 20 is provided with a frame member 54 (Figure 7) connected to each of the front posts 21 and extending horizontally inwardly. The inner ends of the frame members 54 are spaced from each other as shown in Figure 7 for the passage of the stalks therebetween, as will become apparent. Each member 54 is provided with a bearing 55 having bearing ears 56 receiving a short shaft 57 received in a bearing eye 58 carried by a guiding and cutting element indicated as a whole by the numeral 59. One of these elements is shown in detail in Figure 8 and comprises a flat elongated body portion 60 to which the bearing eye 58 is connected, and the forward end 61 of the body curves upwardly and away from the adjacent element 59 as shown in Figures 3 and 6. Intermediate its ends, each member 59 at the side thereof nearest the adjacent member 59 is provided with a coulter 62 having a downwardly and rearwardly curved cutting edge for cutting through the roots which project laterally from the stalks with respect to the direction of movement of the apparatus. These coulters cut roots which are relatively close to the surface of the ground, as will be apparent.

Each element 59 is provided with means for cutting similarly extending roots which are further below the surface of the ground. As shown in Figure 8 the body of each element 59 is cut away adjacent its rear end and at the side thereof toward the adjacent element 59, as at 63. In the space thus provided is arranged a downwardly and rearwardly sloping blade 64 having a forward cutting edge lying in the same plane as the cutting edge of the coulter 62. The blade 64 is carried by a shaft 65, adjacent and parallel to the shaft 57 and extending through an eye 66 (Figure 8) which may be formed integral with the bearing eye 58. The other end of each shaft 65 may be provided with a crank arm 67 (Figures 6 and 7). A relatively heavy coil spring 68 is connected at one end to each crank 67 and is suitably connected at its other end to an adjacent frame portion of the apparatus. The rearward sloping of the blades 64 eliminates any tendency of the blades to pick up and carry along with them roots or other elements which might tend to interfere with their operation, while the pivoting of each blade permits it to swing upwardly upon striking stones or the like. It will be obvious that in the normal operation of the apparatus the forward ends of the units 20 are supported with respect to the ground by contact of the elements 59 with the ground. The cutting of the coulters 62 and blades 64 into the ground severs the laterally projecting roots of the stalk and facilitates the pulling up of the stalk in a manner to be described.

Each of the main frames is provided toward the rear end thereof with a shaft 70 (Figures 9 and 13). The upper end of each shaft 70 is rotatable in a bearing 71 carried by a housing 72 and this housing is carried by a cross member 73 secured to the upper frame members 24 and 25. The shaft 70 is perpendicular to the planes of the frame members 24 and 25 and has its lower end mounted in the bearing 74 carried by a cross member 75 secured to the lower frame members 31 and 32. Circular cutting blades 76 are carried by the shaft 70 at spaced points therealong, the lower blades preferably being closer to each other than the remaining blades so as to cut the thicker portions of the stalks in shorter pieces, as will become apparent.

Each shaft 70 is provided at its upper end, within the housing 72, with a bevel gear 77 (Figures 12 and 13) meshing with a bevel gear 78 carried by a short shaft section 79. The gears 77 and 78 are arranged in the housing 72, the latter providing a bearing for the shaft section 79.

Referring to Figures 1, 3 and 12, it will be noted that the shaft section 79 at each side of the apparatus is connected by a universal joint 80 to a shaft 81 connected by a slip joint 82 to another shaft 83, alined with the shaft 81. The slip joint 82 permits the shafts 81 and 83 to move endwise with respect to each other, for a purpose to become apparent, while positively connecting these shafts for rotation with each other.

The shafts 81 and 83 slope downwardly and rearwardly as shown in Figure 1 and each shaft 83 is connected at its rear end by a universal joint 84 to a short shaft section 85 (Figure 12). Each shaft 85 is journalled in a bearing 86 carried by one wall of the housing 87. Within this housing each shaft 85 carries a bevel gear 88 meshing with a similar gear 89 carried by a shaft 90. This shaft extends at its ends into the housings 87 and carries both of the bevel gears 89, the central portion of the shaft 90 extending through a housing 91 and carrying a bevel gear 92 therein.

A housing 93 is provided between the housing 91 and each of the housings 87, as shown in Figure 12. This arrangement fixes the three housings at the rear of the apparatus to each other. A similar tubular housing 94' is connected between the housing 91 and a projecting integral housing 95 carried by the differential casing 17 and through which a power take-off shaft 96 extends. This shaft may be connected to the ring gear or to any other driven element within the differential casing and forms per se no part of the present invention, and is provided at its rear end with a bevel gear 94 meshing with gear 92.

Each of the main frame structures of the apparatus carries a second shaft 98 adjacent and parallel to the shaft 70 and journalled at its upper and lower ends in bearings 99 and 100 carried respectively by the cross members 73 and 75. The shaft 98 carries a plurality of disks 101 each of which is arranged in contacting overlapping relationship to one of the cutter elements 76 to act as stalk-shearing elements in conjunction therewith. Each disk 101 carries pairs of upper and lower fingers 102 and 103, these fingers being radial as shown in Figure 9. The lower finger 102 of each pair extends beneath the associated cutter 76 and the upper finger of each pair is offset to extend over the cutter member 76. The pairs of fingers serve to positively feed the stalks to the cutter members, as will become apparent.

Means are provided for driving the shafts 98 at opposite sides of the apparatus. Referring to Figures 3, 4 and 13, the numeral 105 designates a housing as a whole extending transversely of the apparatus and comprising a central tubular section 106 and end sections 107 closed at their extremities as at 108. The housing sections 107 are secured to the respective cross members 75 (Figure 13) and telescopically receive the central section 106. This arrangement permits movement of the main frames 20 bodily toward and away from each other.

Within each housing section 107 is arranged a bearing 109 receiving a shaft 110 to which is connected a bevel gear 111 meshing with a similar gear 112 (Figure 13) carried by the lower end of the shaft 98. The shafts 110 are connected by slip joints 113 to a central shaft 114 journalled in a bearing 115 carried by the housing section 106. The shaft 114 carries a bevel gear 116 (Figure 4).

A rearwardly and upwardly extending tubular housing 117 is provided at its forward end with a sleeve 118 surrounding and fixed to the housing 106. At its rear end, the housing 117 telescopically receives a tubular housing 119 having its rear end connected to a bearing 120 forming one wall of a gear housing 121. A shaft 122 is journalled in the bearing 120 and carries a bevel gear 123. At its other end, the shaft 122 carries an elongated head 124 rotatable in the housing 117. A shaft 125 has its rear end splined in the head 124 and is rotatable in a bearing 126 carried by the housing 117. Within the housing 106, the shaft 125 carries a bevel gear 127 meshing with the gear 116. It will be apparent that the gear 127 may be driven by the gear 123 and that the shafts 122 and 125 and housings 117 and 119 are adapted to partake of axial movement with respect to each other, for a reason which will become apparent.

The housing 121 carries a pair of bearings 128 rotatably supporting a tubular shaft 129 which carries a bevel gear 130 within the housing 121 meshing with the gear 123. Wheels 131 are mounted on the ends of the tubular shaft 129 and have their hubs 132 fixed to the tubular shaft. The wheels 131 roll over the ground when the apparatus is in operation and drive the shafts 98 (Figure 13) through the various gear and shaft connections described.

Means are provided for lifting the wheels 131 out of contact with the ground, for example while turning the tractor from the end of one pair of rows of stalks into alinement with the next pair of rows, and such means lowers the rear ends of the frames 20 to be supported by the ground. For the latter purpose, the rear end of each frame 20 is provided with a caster wheel 133 (Figure 1). When the wheels 131 are in engagement with the ground, the caster wheels 133 are elevated from engagement with the ground.

Referring to Figure 4, the numeral 135 designates a relatively heavy bar extending transversely of the apparatus and having its ends mounted in elongated sockets 136 having flanges 137 by means of which they may be secured beneath the respective inner frame members 31. The elongation of the sockets 136 is for the purpose of providing sufficient play beyond the ends of the rod 135 to permit lateral adjustment of the frames 20, as will become apparent. The rod 135 throughout the greater portion of its length is arranged approximately in alinement with the axis of the housing 117, the central portion of the rod 135 being bent downwardly as at 138 to clear the housing 117.

A pair of arms 139 have their forward ends enlarged as at 140 to receive the rod 135, and each arm 139 is similarly enlarged as at 141 to receive a rod 142 parallel to the rod 135. Each rod 142 is received in a socket 143, which may be identical with the sockets 136, being provided with attaching flanges 144 for connecting it to the adjacent frame member 31. At its inner end, each rod 142 terminates in a crank arm 145 having a head 146 receiving one end of a shaft 147 (Figure 4). This shaft extends through the tubular shaft 129, and it will be apparent that raising and lowering of the shaft 147 will raise and lower the wheels 131.

Referring to Figures 1, 3 and 4 the numeral 150 designates an operating lever as a whole having a handle 151 and spaced arms 152 pivotally connected at their lower ends as at 153 to the bars 139. Each arm 152 carries a link 154 connecting it to the adjacent end of the shaft 147. The lower ends of the arms 152 operate adjacent a toothed sector 155 engageable by a detent 156 whereby the lever 150 may be locked in the desired positions. Each detent 156 is operable by a small handle 157, adjacent the handle 151, and connected in any suitable manner, as by a Bowden wire (not shown) with the associated detent 156. It will be apparent that forward movement of the lever 150 will pull upwardly on the links 154 and shaft 147 to lift the wheels 131 from the ground, the rear ends of the frames 20 being simultaneously lowered the short distance necessary for the casters 133 to contact with the ground and support the rear ends of the frames.

The stalk cutting and feeding means associated with the shafts 70 and 98 are provided with novel means for assuring the proper moving of the stalks thereto. The shaft 98 is provided with a sprocket 160 about which passes a chain 161 (Figures 1, 9 and 13) and the forward end of this chain passes around a sprocket 162 supported by a bearing arm 163 rigidly connected to the inner frame member 31. Spaced links of the chain 161 are provided with outstanding lugs 164 which are adapted to engage the stalks and feed them rearwardly at the right side of the chain as viewed in Figure 9. In this connection attention is invited to the fact that Figure 9 shows the chain at the upper side of the apparatus as viewed in Figure 3, that is, at the right side of the tractor. The chain will move in the direction of the arrow at the top of Figure 9 and the gear driving means for the shaft 98, described above, is so designed that the rearward movement of the right hand run of the chain as viewed in Figure 9 is equal in speed to the speed of movement of the tractor over the ground, consequently the lugs 164 at such side of the chain do not move with respect to the ground. Consequently they are adapted to engage the stalks moving into the forward end of the apparatus and the stalks at such time obviously are stationary with respect to the ground.

The lugs 164 operate over a rail 165 (Figures 9, 10 and 13) and this rail is carried by a curved blade 166 adjustably secured as at 167 to a supporting rail 168. This rail is secured at one end to an extension 170 carried by a bearing arm 171 connected to the frame member 30 (Figure 13) and affording an additional bearing support for the shaft 70. The other end of the rail 168 curves away from the sprocket 162 as at 172 and the adjacent end of the rail is supported by a transversely extending arm 172' carried by the adjacent rail 31.

The shaft 98 is provided with a bearing arm 173 and this arm has an extension 174 (Figures 9 and 10). A similar extension 175 is carried by the bearing arm 163. A horizontally arranged channel member 176 is secured at its ends to the extensions 174 and 175 and receives a plurality of gripping members each of which is designated as a whole by the numeral 177 (Figures 10 and 11). Each of these gripping members comprises a body portion 178 having an integral tapered gripping edge 179 projecting therefrom to be overlapped by the adjacent edge of the member 166 as shown in Figure 10. The gripping edge 179 extends beyond one end of the body 178 to form the forward edge of a tongue 180, the opposite end of the body being slotted as at 181 to receive the tongue 180 of the next adjacent gripping member. Each member 177 is provided with a pair of bolts 182 projecting through the base of the channel 176 and provided with a nut 183 to limit the movement of the gripping member out of the channel 176. A spring 184 surrounds each bolt 182, thereby urging the gripping members 178 toward the right as viewed in Figure 10 to tend to hold the gripping edges 179 in engagement with the adjacent edge of the strip 166. These elements cooperate to grip a stalk moving therebetween and prevent its downward movement relative to the plane of the chain 161, and since this chain has its plane sloping upwardly toward the rear sprocket 160, the gripping elements referred to pull each stalk from the ground as it moves relatively rearwardly.

The shaft 98 carries a sprocket 190 (Figures 3 and 13) around which passes a chain 191 and the forward end of this chain passes around a sprocket 192 supported by a bearing bracket 193 which may be carried by one of the forward corner posts of the associated frame 20. Certain of the links of the chain 191 carry fingers 194 (Figures 1 and 13) and the relatively rearwardly running side of the chain 191 has the fingers 194 thereof travelling against or in close proximity to a rail 195. The forward end of this rail turns outwardly as at 196 (Figures 3 and 13) for connection with one of the forward corner posts 21, such post being directly behind the post 30 in Figure 13. The rear end of the rail 195 is supported with respect to the post 31 by a supporting arm 197.

Means are provided for elevating the forward ends of the frames 20, when desired, whereby the latch device shown in Figure 16 will operate and will support the frames in their upper position until released upon the pulling of the cables 16. Referring to Figures 1, 2, 14 and 15, the numeral 200 designates as a whole a novel type of wheel which is operable for elevating the forward end of each of the frames 20, one of these wheels being arranged at the forward end and outwardly of each frame 20. Each of the wheels 200 is mounted on a shaft 201 supported by a bar 202, and the wheel comprises a plurality of radial arms 203 which are relatively thin and may be equidistantly spaced as shown in Figure 14. An additional spoke 204, of substantial width, is arranged at the forward side of each wheel 200 when the latter is latched in its normal position and the underside of the arm 204, as viewed in Figure 14, is provided with a sharp projecting lip 205. The arm 204 is substantially heavier than any of the arms 203 and consequently greatly unbalances the wheel 200 to tend to cause it to rotate in a counterclockwise direction as viewed in Figure 14. The outer extremities of the arms 203 and 204 lie on a circle concentric with the axis of the shaft 201.

The corner post 21 is provided with a slot 206 through which projects a locking finger 207 carried by the lower end of a lever 208 pivoted to the corner post 21 as at 209. The upper end of the lever extends inwardly from the post 21 and is weighted as at 210 to tend to hold the finger 207 in locking position. Above its pivot 209, each lever 208 is provided with an eye 211 to which is connected a flexible cable 212. Extending through an opening 213 in the post 21, and thence around a pulley 214 upwardly and rearwardly to a point adjacent the post 22, the cable terminates in a finger ring or the like 215.

A slightly modified form of the apparatus is shown in Figure 17, such form being adapted for use with tractors having fly wheels arranged at the sides of the tractor above the frame thereof. In such form of the invention, most of the elements are identical with the elements shown in Figure 13 and will be generally designated by the same reference numerals. The shaft 70 and the parts connected thereto are, in fact, identical with the corresponding parts in Figure 13. The shaft 98 in Figure 17 is divided to form upper and lower sections 216 and 217, the former being relatively light and the latter relatively heavy. The different sized shafts are preferably employed for the reason that the stalks being cut are heavier toward the bottom than toward the top. This also permits the use of smaller disks 101 and associated elements, and the structure as a whole permits an offset generally indicated by the numeral 218 in the frame structure to provide the space required for a fly wheel in tractors employing such arrangement. This structure is provided by employing an intermediate transverse frame member 219 with vertical frame members 220 and 221 to connect the transverse member 219 to the upper and lower frame structures.

A driving connection between the shaft sections 216 and 217 is provided by the gearing shown in Figure 18. The cross member 219 is provided with a gear housing 222 in which is arranged a gear 223 carried by the upper end of the shaft selection 217. This gear meshes with an idler gear 224, which, in turn, meshes with a gear 225 carried by the lower end of the shaft section 216. The gearing referred to permits the shaft section 217 to drive the shaft section 216, and in the same direction of rotation.

The operation of the form of the apparatus shown in Figures 1 to 16 is as follows:

The driving connection from the tractor to the stalk cutting apparatus of the present invention is provided through the yoke 35. Such yoke is fixed with respect to the extension 19 (Figure 1) and positively pushes the frame members 20 by the connection of the engaging members 37 with the rear frame elements 22. The horizontal dimension of the guide slot in each member 37 is substantially greater than the width of the base of the frame member 22 which fits therein, thus permitting lateral movement of the frame members 20 with respect to the yoke 35 to accommodate the apparatus to slight variations in the spaces between the rows of stalks, as will become apparent.

Normally the parts of the apparatus occupy the positions shown in Figure 1, the rear ends of the frames 20 being supported by the wheels 131 with the casters 133 out of engagement with the ground, and with the forward ends of the frames supported on the ground by the guide shoes 59. Assuming that the tractor is being driven between two rows of stalks which it is desired to cut and assuming that the spaces between the rear ends of the guide shoes 59 are alined with the stalks, the first operation will be the cutting of some of the roots of the stalk and the soil through which the roots extend. Referring to Figures 1, 6, 7 and 8 it will be noted that as the flat portions of the guide shoes 59 slide over the ground, the coulters 62 of each pair of guide shoes will cut into the ground along parallel lines. This results in loosening the ground and rendering the stalks more easily pulled out of the ground, and likewise results in cutting the laterally extending roots which are close to the surface of the ground. The cutters 64 follow the coulters in alinement therewith and cut the more deeply embedded roots and at the same time act to further loosen the soil. The cutters 64 are inclined (Figure 6) and are spring urged to normal position. The downward and rearward inclination of these cutters permits them more easily to be swung rearwardly upon encountering stones, etc., while the springs 68 exert sufficient force to cause the cutters to remain in their operative positions under sufficient pressure to perform their intended operations.

The foregoing operations having been performed, the tractor progresses forwardly to the point where the stalks will enter the frame structures. The lower portions of the stalks will be engaged by the lugs 164 (Figures 9 and 10) and these lugs at the rearwardly moving side of the chain 161 ride over the rail 165, thus confining a stalk between an adjacent pair of lugs 164 and between the chain 161 and the rail 165. At the same time, the upper end portion of the stalk will be engaged by the fingers 194 of the chain 191 and on the rearwardly moving side of this chain the fingers 194 operate along the rail 195, thus confining the upper ends of the stalks.

The lugs 164 positively feed the stalks relatively rearwardly and upon entering the forward end of the apparatus, each stalk is engaged between the elements 166 and 179 to be gripped thereby under substantial pressure. Referring to Figure 1 it will be noted that the chain 161 slopes upwardly toward the rear of the apparatus, and since this is likewise true of the associated elements 166 and 179, it will be apparent that the gripping of the stalk between the latter elements results in the upward pulling of the stalk as the latter moves relatively rearwardly.

As the stalk approaches the transverse plane of the rear shafts 70 and 98, the fingers 103 of the disks 101 will engage the stalk at numerous points therealong, the fingers engaging the stalk in the plane of each of the cutting blades 76. Thus the stalks are forced into engagement with the rapidly rotating cutters, whereby the stalk is cut into as many relatively short pieces as desired. The pieces of the cut stalk drop to the ground and are permitted because of their relatively small size to be readily turned under the soil to decay and fertilize the soil. The lowermost cutters 76 are relatively heavy and the thickness of the cutters may progressively decrease toward the upper end of each shaft 70 for the reason that the thickness of each stalk decreases toward its upper end to permit it to be relatively easily cut. Moreover, the lowermost cutters 76 are preferably closer to each other than the upper cutters so as to cut the thicker portions of the stalk into smaller pieces to permit them to decay more easily.

It will be apparent that the members 166 (Figure 10) are relatively rigid while the coacting members 179 are laterally movable against the tension of the springs 184. This arrangement permits stalks of any thickness to pass through the apparatus and still be tightly engaged so that the roots may be pulled from the ground as the stalks move relatively rearwardly and upwardly due to the inclination of the gripping and feeding devices referred to.

When the end of a pair of rows is reached and it is desired to turn the tractor around to pass between the next adjacent pair of rows, the stalk cutting mechanism is preferably rendered inoperative. This is accomplished by releasing the detents 156 (Figures 1 and 4) and pushing forwardly on the lever handle 151, and by pulling rearwardly on the finger rings 215. The first operation causes the links 154 to pull upwardly on the ends of the shaft 147 (Figure 4) thus swinging the cranks 145 on the axis of their transverse body portions 142. Thus the wheels 131 will be lifted out of contact with the ground while the rear ends of the frames 20 will be lowered to engage the caster rollers 133 with the ground to support the rear ends of the frames. The lifting of the wheels 131 stops the driving of the shafts 98 through the driving mechanism illustrated in Figures 4 and 13.

The pulling of the finger rings 215 (Figure 1) exerts a pull on the upper end of the lever 208 (Figure 15) of each stalk cutting mechanism, thus releasing the latch finger 207 (Figures 14 and 15) from the spoke 203 which it normally engages. The relatively heavy arm 204 then causes the wheel 200 to turn in a counterclockwise direction as viewed in Figure 14 until the point 205 engages the ground and subsequently causes positive rotation of the wheel.

The wheel 200, when thus rendered operative, causes the forward ends of the frame 20 to be moved upwardly and each wheel 200 rolls around on the ends of the arms 204 and 203. Upward movement of the frames 20 obviously lifts the bars 44 (Figures 5 and 16) and with them their housings 42, and when the latter elements reach their upper limits of movement the latches 51 will engage beneath the housing 42 to support the forward end of each frame structure. The structure shown in Figure 16 is employed in conjunction with the housing 42 at the forward end of the apparatus and the same structure is employed at the rearward housing 42 except that no latches 51 are employed since it is unnecessary to lock in any position the rear ends of frame structures 20 since they are supported under all conditions either by the wheels 131 or by the caster rollers 133.

After the operations referred to have been completed the operator may release the rings 215 (Figure 1) whereupon the wheels 202 will be stopped in their normal positions. The arm 203 which is normally vertical (Figure 14) is provided with a lug shown in dotted lines in Figure 14 and in solid lines in Figure 15 in the path of travel of which the finger 207 is arranged so as to stop each wheel 200 in its proper normal position. After the tractor has been turned to a proper position to start between another pair of rows of stalks, the operator will release the detents 156 and pull rearwardly on the handle 151 (Figure 1) whereupon the links 154 will effect relative downward movement of the wheels 131 and relative upward movement of the rear ends of the frames 20, thereby lifting the caster roller from engagement with the ground and supporting the rear end of the apparatus by the wheels 131. The operator will then pull the finger ring 53 to release the latches 51 and thus drop the forward ends of the two sides of the apparatus into their normal operative positions.

The engaging members 37 permit vertical movement of the rear of the frame structures 20 because of their sliding engagement with the posts 22. This structure also permits lateral movement of the rear ends of the frame structures 20 in the manner stated. Assuming that the pairs of guide shoes 59 are not exactly alined with the stalks, the engagement of the shoes with the stalks close to the ground will effect the necessary lateral movement to aline the parts. The exertion of lateral force against one pair of the shoes 59 will move its associated frame structure and this movement will be transmitted through the associated forward bar 44 (Figures 3, 5 and 16) to cause the corresponding rack teeth 46 to rotate the pinion 47 and thus transmit similar movement to the opposite bar 44. Thus it will be apparent that slight inward movement of the forward end of one frame structure 20 will effect similar movement of the other frame structure 20. Conversely slight outward movement of the forward end of one frame structure will effect similar slight outward movement of the forward end of the other frame structure.

Rotation of the pinion 47 will rotate the shaft 48 (Figures 1 and 3) which extends to the rear pinion and rack mechanism, and accordingly it will be apparent that the rear ends of the frame structures will partake of the same movement as the forward ends, thus keeping these frame structures in parallelism under all conditions.

The driving mechanism for the stalk feeding means comprising the disk 101, fingers 103, chain 191, etc. is shown in Figures 4 and 13. The elements referred to derive their power from the wheels 131 which roll over the ground thus facilitating the designing of the parts so that the chains 191 will be driven with their operative runs moving at a speed corresponding to the speed of movement of the tractor whereby they are relatively stationary with respect to the ground as is true of the stalks. Therefore the fingers 194 are enabled to hold the stalks in vertical position during movement rearwardly to the cutters. The chain 161 and associated elements are similarly driven from the shaft 98 and operate in the same manner to feed the stalks relatively rearwardly in an upright position while the elements 166 and 179 grip the stalks and gradually pull them upwardly from the ground as they move relatively rearwardly.

Since the swinging of the wheels 131 between operative and inoperative positions takes place about the axis of the alined shafts 142, it is necessary to provide the telescoping casings 117 and 119 and the slip joint shaft connection 124, 125. The swinging movement of the wheels 131 swings the casing sections 117 and 119 and the sleeve 118 turns about the axis of the housing 105. The slip joint connections 113 and the telescoping relation between the housing sections 106 and 107 permits the latter to move axially with respect to the gear housing 105 into adjusted positions occurring incident to lateral movement of the frames 20 in the manner stated.

The driving mechanism for the cutter shafts 79 is shown in Figures 1, 3 and 12. The power take-off shaft 96 drives through gears 94 and 92 and shafts 90, and thence through gears 89 and 83 to drive the bevel gears 78 to rotate the bevel gears 77 (Figures 12 and 13) to drive the cutters 76 at the proper relatively high speed. The universal joints 80 and 84 and the slip joints 82 are provided to permit the rear ends of the frame structures 20 to partake of their lateral adjustment and to move vertically in accordance with movement of the wheels 131 between operative and inoperative positions, as will be apparent.

The operation of the form of the invention shown in Figure 17 will be apparent from the foregoing description. This form of the invention provides an offset 218, thus allowing space for the fly wheels of tractors using such wheels at opposite sides of the frames 49 thereof. This offset arrangement is permissible because of the fact that the upper ends of the stalks to be cut with the apparatus are relatively thin, thus permitting smaller upper blades 76 and smaller upper disks 101. The lower shaft section 217 is relatively preferably heavy and the lower cutters 76 are preferably correspondingly heavy because of the thickness of the portions of the stalks which are cut by the lower cutters 76. The gearing shown in Figure 18 is employed so that both shafts 216 and 217 will rotate in the same direction, the gears 223 and 225 being identical in size so that the two shafts referred to will rotate in the same direction.

From the foregoing it will be apparent that the present apparatus is particularly adapted for cutting stalks, such as cotton stalks, after the crop has been harvested, and provides novel means for attaching the apparatus to a tractor to be driven thereby and for simultaneously cutting the stalks of two rows. The laterally extending roots of the stalks are cut by the coulters 62 and blades 64 and the ground is loosened by these elements at the same time, thus permitting the stalks to be easily pulled from the ground. The cut stalks are permitted to drop to the ground where they can be easily plowed under because of their relatively small size, thus eliminating the usual time and labor required for gathering the stalks and burning or otherwise disposing of them.

It is to be understood that the forms of the invention herewith shown and described are to be taken as preferred examples of the same and that various changes in the shape, size and arrangement of parts may be resorted to without departing from the spirit of the invention or the scope of the subjoined claims.

I claim:

1. A stalk cutting apparatus comprising a vehicle, a frame carried by said vehicle and having its forward end open for the entrance of standing stalks thereinto, stalk cutting means carried by said frame, guide elements at the forward end of said frame for guiding the stalks for entrance thereinto, and means for supporting the frame with respect to the vehicle for lateral movement independently thereof to accommodate the frame to varying positions of the successive stalks.

2. A stalk cutting apparatus comprising a frame, stalk cutters carried by said frame at a point spaced from the forward end thereof, means for guiding stalks for entrance into the forward end of said frame, and conveying means for supporting the stalks in upright position and moving them relatively rearwardly toward said cutters, said conveying means sloping upwardly and rearwardly toward said cutters and having gripping portions constructed and arranged to grip the stalks to thereby pull them from the ground as they move relatively toward said cutters.

3. A stalk cutting apparatus comprising a frame, stalk cutters carried by said frame at a point spaced from the forward end thereof, means for guiding stalks for entrance into the forward end of said frame, conveying means for supporting the stalks in upright position and moving them relatively rearwardly toward said cutters, said conveying means sloping upwardly and rearwardly toward said cutters and having gripping portions constructed and arranged to grip the stalks to thereby pull them from the ground as they move relatively toward said cutters, and means for supporting said frame for lateral movement to accommodate said guiding means to variations in the positions of successive stalks.

4. A stalk cutting apparatus comprising a frame, stalk cutters carried by said frame at a point spaced from the forward end thereof, means for guiding stalks for entrance into the forward end of said frame, conveying means for supporting the stalks in upright position and moving them relatively rearwardly toward said cutters, said conveying means sloping upwardly and rearwardly toward said cutters and having gripping portions constructed and arranged to grip the stalks to thereby pull them from the ground as they move relatively toward said cutters, means for supporting the forward end of said frame for lateral movement to accommodate said guiding means to variations in the positions of successive stalks, and means for connecting said frame to a tractor to be propelled thereby, said last named means being constructed and arranged to provide for lateral movement of said frame independently of the tractor.

5. A stalk cutting apparatus comprising an elongated frame, means for connecting the forward end of said frame to a tractor, stalk cutters carried by said frame adjacent the rear end thereof, means at the forward end of said frame for guiding successive stalks relative to said frame for entrance thereinto, means for conveying stalks relatively rearwardly to said cutters, a wheel connected to said frame and engageable with the ground to support the rear end of said frame, transmission means connecting said wheel to said conveying means to drive them, and means for moving said wheel relative to the frame to lower the rear end of the frame to be supported by the ground and for lifting said wheel out of contact with the ground to stop operation of said conveying means.

6. A stalk cutting apparatus comprising an elongated frame, means for connecting the forward end of said frame to a tractor, stalk cutters carried by said frame adjacent the rear end thereof, means at the forward end of said frame for guiding successive stalks relative to said frame for entrance thereinto, means for conveying stalks relatively rearwardly to said cutters, a wheel connected to said frame and engageable with the ground, transmission means connecting said wheel to said conveying means to drive them, said conveying means sloping upwardly and rearwardly toward said cutters and having gripping portions constructed and arranged to grip successive stalks to pull them from the ground as they move relatively rearwardly.

7. A stalk cutting apparatus comprising an elongated frame, means for connecting the forward end of said frame to a tractor, stalk cutters carried by said frame adjacent the rear end thereof, means at the forward end of said frame for guiding successive stalks relative to said frame for entrance thereinto, means for conveying stalks relatively rearwardly to said cutters, a wheel connected to said frame and engageable with the ground, transmission means connecting said wheel to said conveying means to drive them, the means for connecting the forward end of said frame to the tractor being constructed and arranged to provide for lateral movement of said frame to accommodate said guiding means to varying positions of successive stalks, and means for effecting lateral movement of the rear end of said frame corresponding to lateral movement of the forward end thereof, said transmission means being constructed and arranged to accommodate itself to lateral movement of said frame.

8. A stalk cutting apparatus comprising an elongated frame, means for connecting the forward end of said frame to a tractor, movable stalk cutters carried by said frame adjacent the rear end thereof, means at the forward end of said frame for guiding successive stalks relative to said frame for entrance thereinto, means for conveying stalks relatively rearwardly to said cutters, a wheel connected to said frame and engageable with the ground, transmission means connecting said wheel to said conveying means to drive them, the tractor having a power take-off shaft, and means for driving said cutters from said shaft.

9. A stalk cutting apparatus comprising a pair of elongated frames adapted for arrangement on opposite sides of a tractor, guide means carried by the forward end of each frame for guiding successive stalks thereinto, stalk cutters carried by each frame, and means connecting said frames for simultaneous lateral movement to accommodate said guide means to varying widths of rows of stalks, said last named means being constructed and arranged to effect lateral movement of either frame upon lateral movement of the other frame by engagement of the latter with a stalk.

10. A stalk cutting apparatus comprising a pair of elongated frames adapted for arrangement on opposite sides of a tractor, guide means carried by the forward end of each frame for guiding successive stalks thereinto, stalk cutters carried by each frame, means connecting said frames for simultaneous lateral movement to accommodate said guide means to varying widths of rows of stalks, and common means connecting the rear ends of both of said frames to said tractor whereby the latter propels said frames.

11. A stalk cutting apparatus comprising a pair of elongated frames adapted for arrangement on opposite sides of a tractor, guide means carried by the forward end of each frame for guiding successive stalks thereinto, stalk cutters carried by each frame, means connecting said frame for simultaneous lateral movement to accommodate said guide means to varying widths of rows of stalks, and common means connecting the rear ends of both of said frames to said tractor whereby the latter propels said frames, said common means having lateral sliding connection with each frame to permit lateral movement thereof.

12. A stalk cutting apparatus comprising a pair of elongated frames adapted for arrangement on opposite sides of a tractor, guide means carried by the forward end of each frame for guiding successive stalks thereinto, stalk cutters carried by each frame, means connecting said frames for simultaneous lateral movement to accommodate said guide means to varying widths of rows of stalks, common means connecting the rear ends of both of said frames to said tractor whereby the latter propels said frames, means for conveying stalks relatively rearwardly to the cutters of each frame, and a ground wheel device for driving the conveying means of both frames.

13. A stalk cutting apparatus comprising a pair of elongated frames adapted for arrangement on opposite sides of a tractor, guide means carried by the forward end of each frame for guiding successive stalks thereinto, stalk cutters carried by each frame, means connecting said frames for simultaneous lateral movement to accommodate said guide means to varying widths of rows of stalks, common means connecting the rear ends of both of said frames to said tractor whereby the latter propels said frames, means for conveying stalks relatively rearwardly to the cutters of each frame, a ground wheel device for driving the conveying means of both frames, means for moving said ground wheel device relative to said frames for simultaneously raising said ground wheel device out of contact with the ground and lowering the rear ends of said frames, and supporting wheels for the rear ends of said frames engageable with the ground when they are lowered.

14. A stalk cutting apparatus comprising a pair of elongated frames adapted for arrangement on opposite sides of a tractor, guide means carried by the forward end of each frame for guiding successive stalks thereinto, stalk cutters carried by each frame, means connecting said frames for simultaneous lateral movement to accommodate said guide means to varying widths of rows of stalks, common means connecting the rear ends of both of said frames to said tractor whereby the latter propels said frames, means for conveying stalks relatively rearwardly to the cutters of each frame, a ground wheel device for driving the conveying means of both frames, means for moving said ground wheel device relative to said frames for simultaneously raising said ground wheel device out of contact with the ground and lowering the rear ends of said frames, and supporting wheels for the rear ends of said frames engageable with the ground when they are lowered, said common means being constructed and arranged whereby the rear ends of said frames are adapted to move upwardly and downwardly.

15. A stalk cutting apparatus comprising a pair of elongated frames adapted for arrangement on opposite sides of a tractor, guide means carried by the forward end of each frame for guiding successive stalks thereinto, stalk cutters carried by each frame, means connecting said frames for simultaneous lateral movement to accommodate said guide means to varying widths of rows of stalks, common means connecting the rear ends of both of said frames to said tractor whereby the latter propels said frames, means for conveying stalks relatively rearwardly to the cutters of each frame, a ground wheel device for driving the conveying means of both frames, and cutting elements carried by said guide means for cutting through the laterally extending roots of each stalk, said conveying means being constructed and arranged to pull the stalks vertically from the ground as they move relatively toward said cutters.

16. A stalk cutting apparatus comprising a pair of elongated frames adapted for arrangement on opposite sides of a tractor, guide means carried by the forward end of each frame for guiding successive stalks thereinto, stalk cutters carried by each frame, means connecting said frames for simultaneous lateral movement to accommodate said guide means to varying widths of rows of stalks, common means connecting the rear ends of both of said frames to said tractor whereby the latter propels said frames, means for conveying stalks relatively rearwardly to the cutters of each frame, a ground wheel device for driving the conveying means of both frames, and cutting elements carried by said guide means for cutting through the laterally extending roots of each stalk, said conveying means sloping upwardly and rearwardly toward said cutters and being constructed and arranged to grip the stalks as they move relatively rearwardly to pull them from the ground.

17. A stalk cutting apparatus comprising an elongated frame, means for connecting said frame to a tractor for vertical movement with respect therto, means for connecting said frame to the tractor to be propelled thereby, stalk cutters carried by said frame, guide shoes carried by the forward end of said frame and slidable over the ground for guiding successive stalks relative to said frame for entrance thereinto, means engageable with the ground for elevating the forward end of said frame to lift said shoes from the ground, releasable means normally rendering said elevating means inoperative and latch means for holding the forward end of said frame in elevated position when moved to said position by said elevating means.

PERRY W. SPELL.